US009413028B2

(12) United States Patent
Ichihara et al.

(10) Patent No.: US 9,413,028 B2
(45) Date of Patent: Aug. 9, 2016

(54) FUEL CELL STACK

(75) Inventors: Keiji Ichihara, Yokohama (JP);
Yasuhiro Numao, Yokosuka (JP);
Sigetaka Uehara, Kamakura (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 361 days.

(21) Appl. No.: 13/989,863

(22) PCT Filed: Nov. 16, 2011

(86) PCT No.: PCT/JP2011/076394
§ 371 (c)(1),
(2), (4) Date: May 28, 2013

(87) PCT Pub. No.: WO2012/086344
PCT Pub. Date: Jun. 28, 2012

(65) Prior Publication Data
US 2013/0260275 A1   Oct. 3, 2013

(30) Foreign Application Priority Data

Dec. 21, 2010 (JP) .................................. 2010-284245
Dec. 21, 2010 (JP) .................................. 2010-284249

(51) Int. Cl.
*H01M 8/24* (2016.01)

(52) U.S. Cl.
CPC ............ *H01M 8/2475* (2013.01); *H01M 8/247* (2013.01); *H01M 8/248* (2013.01); *H01M 8/249* (2013.01); *H01M 8/2485* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| 2002/0142209 | A1* | 10/2002 | Kikuchi | H01M 8/247 429/454 |
| 2005/0106446 | A1* | 5/2005 | Sato | H01M 8/04029 429/414 |
| 2009/0004533 | A1* | 1/2009 | Tanaka | H01M 8/2475 429/481 |
| 2009/0311571 | A1* | 12/2009 | Takahashi | H01M 8/1002 429/434 |

FOREIGN PATENT DOCUMENTS

| JP | 2001-126749 A | 5/2001 |
| JP | 2003-123828 A | 4/2003 |
| JP | 2003-203670 A | 7/2003 |
| JP | 2005-071869 A | 3/2005 |
| JP | 2005-116227 A | 4/2005 |
| JP | 2006-073459 A | 3/2006 |
| JP | 2009-099383 A | 5/2009 |

* cited by examiner

*Primary Examiner* — Patrick Ryan
*Assistant Examiner* — Christopher Domone
(74) *Attorney, Agent, or Firm* — Young Basile Hanlon & MacFarlane, P.C.

(57) ABSTRACT

A fuel cell stack is provided that comprises a laminate obtained from unit cells of rectangular plates, end plates disposed at both end surfaces of the laminate, and a pair of reinforcing plates disposed on a first and third outer peripheral surfaces, wherein the respective end plates and reinforcing plates are connected. Each reinforcing plate has a base plate covering that covers the first or third outer peripheral surface of the laminate, and a pair of holding portions that cover the second and fourth outer peripheral surfaces of the laminate partly. Each holding portion supports the laminate as a spring element, and the spring elements are attached in the direction of displacement of the laminate. As a result, the resonant frequency of the laminate is increased and vibration resistance is improved without increasing the parts count.

13 Claims, 15 Drawing Sheets

FIG. 10
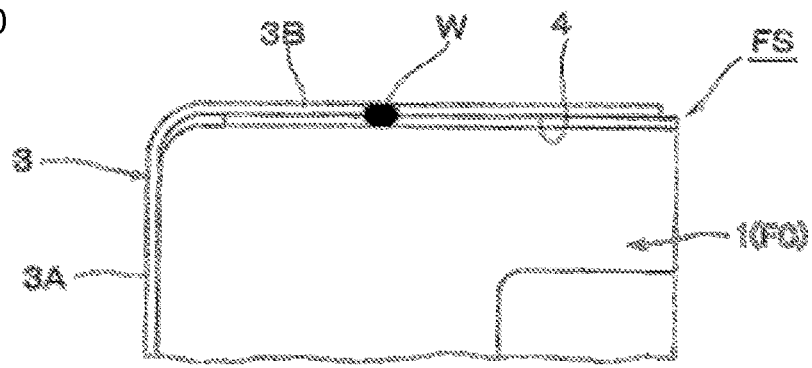
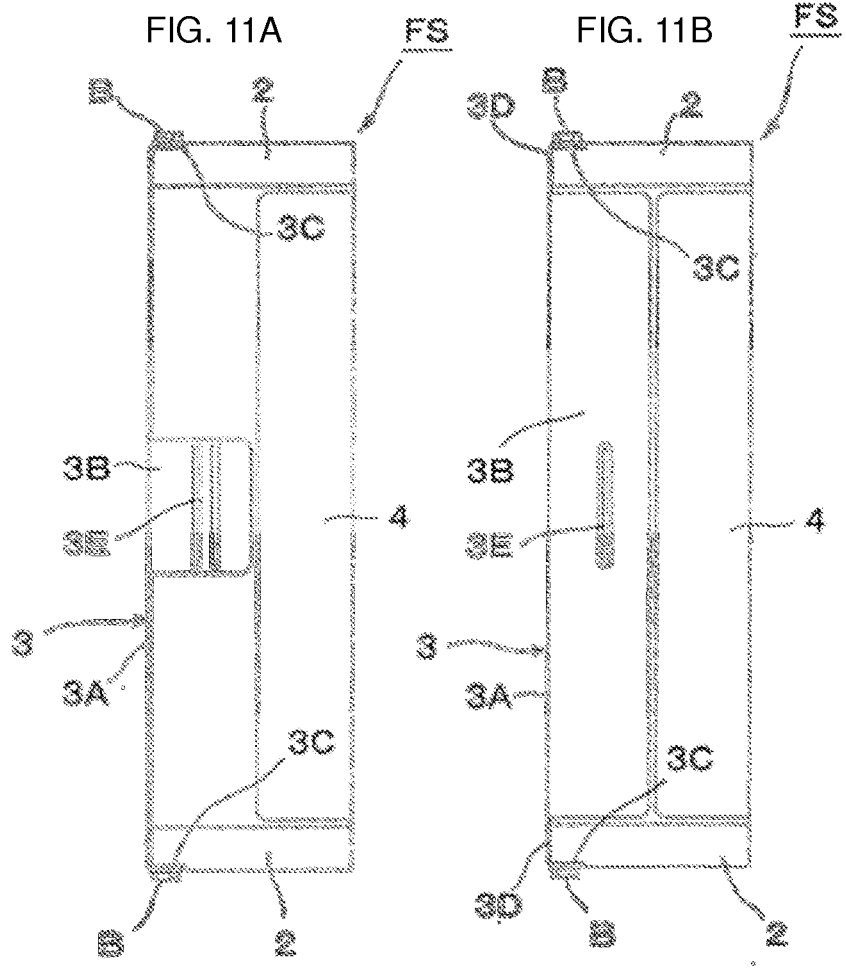
FIG. 11A
FIG. 11B

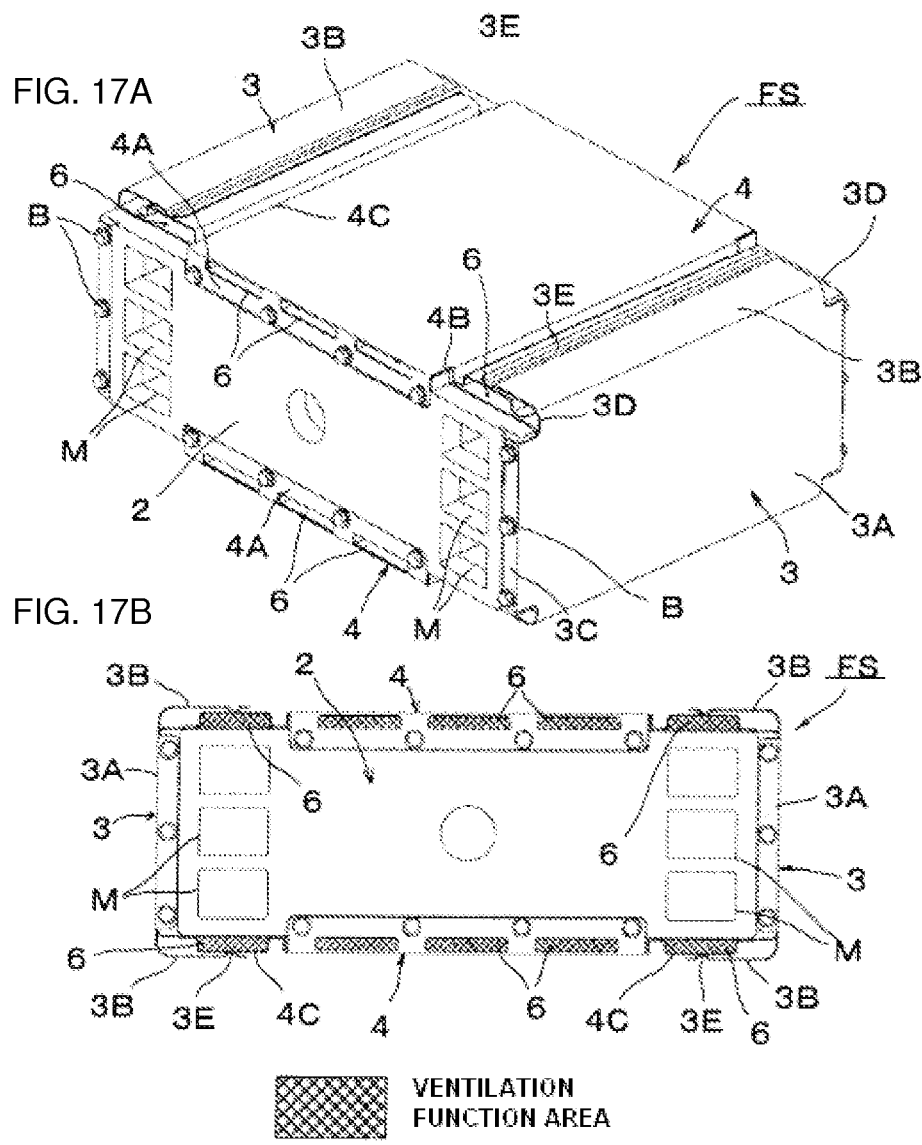

VIBRATION RESISTANCE FUNCTION AREA

VENTILATION FUNCTION AREA

FUEL CELL STACK

TECHNICAL FIELD

The present invention relates to a fuel cell stack used as a power source for driving a vehicle, for example, and more specifically relates to a fuel cell stack comprising a laminate formed by stacking a plurality of unit cells configured by a membrane electrode assembly and a separator.

BACKGROUND

A conventional fuel cell stack having a laminate or stack of unit cells is described in Japanese Laid-Open Patent Application Publication No. 2003-203670, for example. The fuel cell stack described in Japanese Laid-Open Patent Application Publication No. 2003-203670 has a laminate sandwiched with end plates, and both end plates are connected by a tension plate to maintain a pressurized state of the laminate. Further, the fuel stack has a first layer of low friction characteristics and insulating property and a second layer of buffer characteristics interposed between the laminate and the tension plate to absorb vibration and shock from the outside.

According to the fuel cell stack of the prior art described above, since the buffer material (second layer) is a spring element, increasing in resonant frequency (natural frequency) of the laminate leads to improved performance of vibration resistance. However, in a structure in which a cushioning material and the like are interposed between the tension plate and the laminate, there is a problem of increase in the number of components or parts count. Thus, it has been an issue or challenge to solve such a problem.

BRIEF SUMMARY

The present invention has been made by focusing on the problems of the prior art described above, and has the object to provide a fuel cell stack that may improve the resonant frequency (natural frequency) for improving performance of vibration resistance without causing the number of components.

The fuel cell stack according to the present invention is provided with a laminate comprised of a plurality of stacked unit cells of a plate-like rectangle, a pair of end plates disposed on both end surfaces of the laminate in the stacking direction of cells, and a pair of reinforcing plates disposed on the first and third outer peripheral surfaces, the four surfaces defined to be outer peripheral surfaces which are parallel to a cell stacking direction of the laminate in a circumferential direction, wherein both end plates and each reinforcing plate are connected respectively.

In addition, in the fuel cell stack, each reinforcing plate is provided with a base portion covering the first or third outer peripheral surface of the stack and a pair of holding portions extending perpendicularly from the base portion to cover part of the second and fourth outer peripheral surfaces. Each holding portion is configured to form a structure to hold the stack or laminate as a spring element, whereby the problem of the conventional structure is solved.

Further, in the above configuration, the holding portion of the reinforcing plate and the laminate can be in contact or spaced apart from each other with an extremely small gap so as to be brought in contact upon vibration input. However, it is more preferable to hold in the contact state.

According to the fuel cell stack of the present invention, the resonant frequency of the laminate can be increased without increasing the number of parts. Thus, it is possible to improve the vibration resistance performance.

BRIEF DESCRIPTION OF THE DRAWINGS

The description herein makes reference to the accompanying drawings wherein like reference numerals refer to like parts throughout the several views, and wherein:

FIG. 10 is an enlarged cross-sectional view of an end portion of the reinforcing plate in still another embodiment of the fuel cell stack of the present invention.

FIGS. 11A and 11B are respective plan views explaining the reinforcing plate in still another embodiment of the fuel cell stack of the present invention.

FIG. 17A is a perspective view illustrating still another embodiment of the fuel cell stack of the present invention and FIG. 17B is a side view thereof.

DETAILED DESCRIPTION

FIGS. 1 to 4 are diagrams illustrating an embodiment of the fuel cell stack according to the present invention.

Figure 1A:
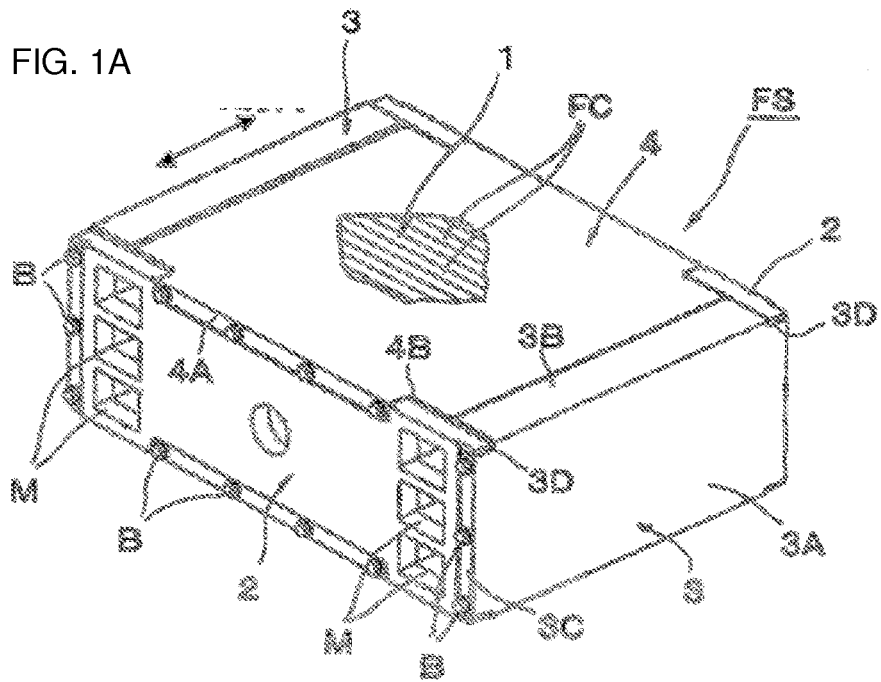
FIG. 1A is a perspective view illustrating one embodiment of a fuel cell stack according to the present invention.
Figure 1B:
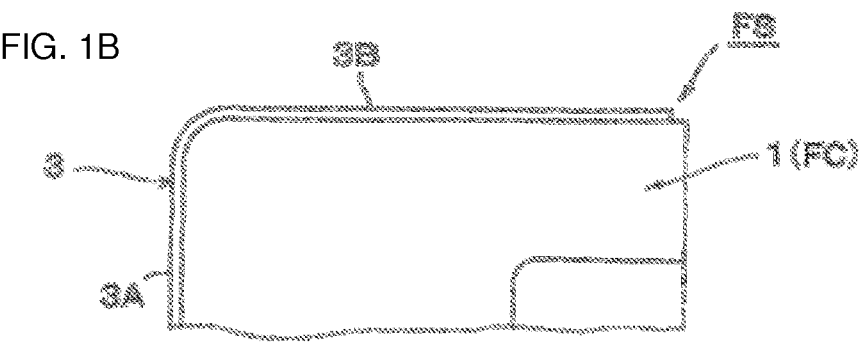
FIG. 1B is an enlarged cross-sectional view of an end portion of the reinforcing plate.
Figure 2:
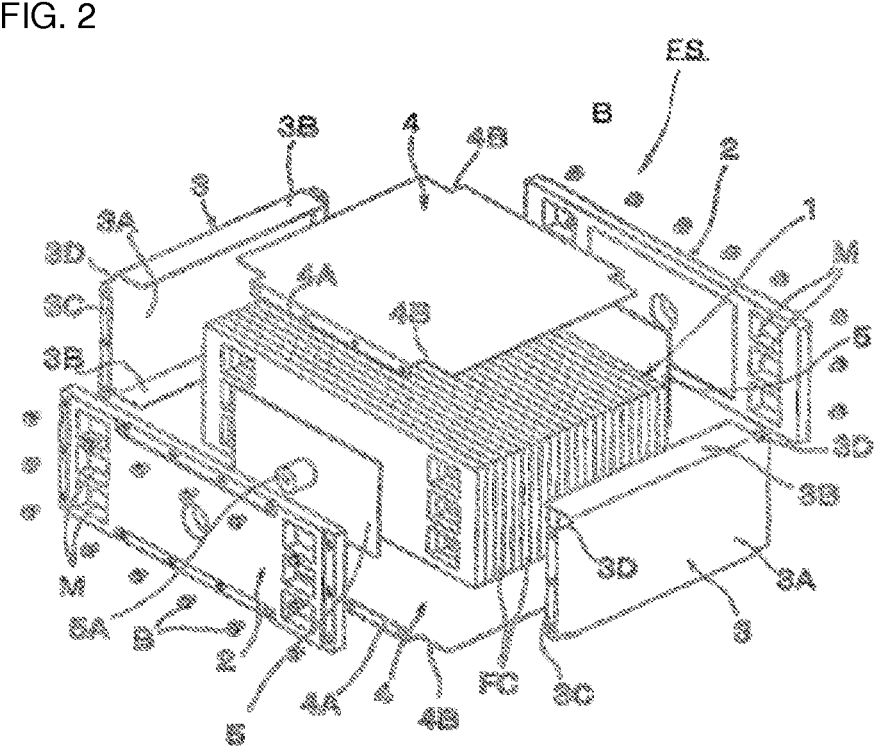
FIG. 2 is an exploded perspective view of the fuel cell stack shown in FIG. 1A.
Figure 3:
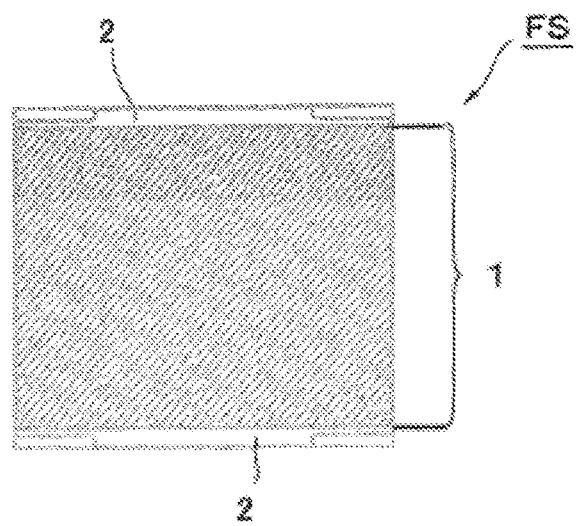
FIG. 3 is a plan view of the fuel cell stack shown in FIG. 1A.

The fuel cell stack FS shown in FIG. 1A and FIG. 2 is provided with a laminate or stack 1 formed by stacking a plurality of unit cells FC of rectangular plate shape, a pair of current collectors disposed on both end surfaces as viewed in the direction of stacking cells (i.e. X direction in the figure), end plates 2, 2 disposed external of respective current collector, a pair of reinforcing plates 3, 3, and a pair of fastening plates 4, 4. The materials for the end plate 2, reinforcing plate 3, and fastening plate 4 are not particularly limited, but are more desirable to be made of metals.

The unit cell FC is configured in the well-known structure in which a MEA (Membrane-Electrode-Assembly) is sandwiched by a pair of separators, and, as shown in FIG. 2, of a rectangular plate shape and stacked in a horizontal direction with its long sides disposed vertically. Note that the unit cell FC is basically made of rectangular, plate shape, but may well be of a similar shape to which the reinforcing plate 3 is mountable when structuring the laminate 1.

Both end plates 2 are formed in a rectangle shape having a vertical and horizontal dimensions substantially equal to those of cell unit FC, whereby a manifold M and the like is formed for supplying anode gas (hydrogen), cathode gas (air), and cooling fluid. Both collectors 5 corresponds to a central portion (power generating unit) of unit cell FC, and is provided with a connector portion 5A passing through the end plates 2.

Each reinforcing plate 3 is disposed on a first or third outer peripheral surface respectively when the four surfaces parallel to the cell stacking direction of the laminate are named or defined as the first to four outer peripheral surfaces in the circumferential direction. In FIG. 1A, the right side of laminate 1 corresponds to the first outer peripheral surface, upper side to the second outer peripheral surface, left side not shown in the figure to the third outer peripheral surface, and the lower side not shown either to the fourth outer peripheral surface, respectively. In other words, in the laminate 1 shown in the example, unit cells FC of rectangular shape are disposed in the horizontal direction, and since this state is easily subjected to being deformed in a direction along short side of unit cell FC, reinforcing plates 3, 3 are provided on the short sides, i.e., on the first and third outer peripheral surfaces.

Each reinforcing plate 3 is provided with a base portion 3A covering the first or third outer peripheral surfaces of laminate 1 entirely and a pair of holding portions 3B, 3B extending perpendicularly from base portion 3A to cover the second and fourth outer peripheral surfaces partly in the longitudinal direction (i.e., cell stacking direction). The reinforcing plate 3 is formed in a grooved shape by both holding portions 3B, 3B in cross-section.

Further, each reinforcing plate 3 is mounted or attached onto the laminate 1 resiliently with both holding portions 3B, 3B spread slightly. Therefore, each reinforcing plate 3 is in contact with the laminate so as to cramp the laminate under a predetermined load. Specifically, the holding portion 3B of reinforcing plate 3 constitutes a structure for supporting the laminate 1 as a spring element.

In addition, both ends of the base portion 3A of each reinforcing plate 3 are bent to form an attachment portion 3C and the attachment portion 3C is connected to the outer surface (the surface opposite from the laminate) by a plurality of bolts B. Moreover, each reinforcing plate 3 is formed with a cut-out portion or notch 3D to serve as the non-interference portion to avoid contact with the outer peripheral surface of end plate 2. Thus, holding portion 3B is avoided to contact the end plate 2 by its tip and the resilient assembly structure by the holding portion 3B is configured to be applied on the area (shaded area) of laminate 1 only in FIG. 3.

Each fastening plate 4 is disposed so as to cover the second and fourth outer peripheral surfaces of laminate 1 respectively. Each fastening plate 4 is sized to cover between holding portions 3B, 3B of the reinforcing plates 3 on respective outer periphery of laminate 1, and is provided at both ends with an attachment portion 4A, which is connected to outer surface (surface opposite from the laminate) of end plates 2 by a plurality of bolts B.

The fuel cell stack FS constructed above is configured to sandwich the laminate 1 and current collector 5 by a pair of end plates 2, 2 in the stacking direction by a predetermined pressure, and both the end plates 2, 2, each reinforcing plate 3,3, and fastening plate 4, 4 so as to hold a pressurized state of laminate 1. In addition, the fuel cell stack FS is formed by functional components, i.e., end plate 2, 2, each reinforcing plate 3, 3, and fastening plate 4, 4 to form a casing integrated structure.

Figure 4:
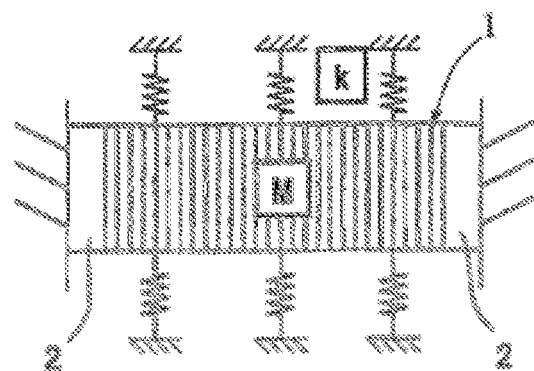
FIG. 4 is an explanatory diagram showing the principle of a spring element in the fuel cell stack shown in FIG. 1A.

In the fuel cell stack FS described above, since holding portion 3B of each reinforcing plate 3 is resiliently assembled, it is configured in such a way that a spring element is mounted in the vibration direction of laminate 1 (vertical direction in FIG. 1A). In other words, as shown in FIG. 4, the system may be regarded to the equivalent structure in which laminate 1 with mass M is supported at a plurality of locations. Specifically, in the present embodiment, the spring element is structured to be continuous in the cell stacking direction by holding portion 3B to support the laminate across the entirety of the cell stacking direction.

In this way, the fuel cell stack FS above described is allowed to increase the resonant frequency (natural frequency) by suppressing displacement of laminate 1 without increasing the number of parts by a simply structured reinforcing plate 3 with a basic portion 3A and holding portion 3B. Moreover a separate member such as buffer material to be interposed between the laminate 1 and reinforcing plate 3 is not necessary at all, and thus the resonance frequency may be increased without causing the volume for accommodating the laminate in the structure supported on the side of the two end plates 2, 2.

Since each manifold M of end plate 2 of the fuel cell stack FS is connected with a connecting pipe to supply or discharge reactant gas or cooling fluid, when structured by supporting on the side of both the end plates 22, the vibrations at the pipe connection portion is advantageously suppressed.

In the fuel cell stack FS, as the increase of resonance frequency of laminate 1, vibration suppressing performance will be improved, and in addition to avoidance of damage of components due to vibration and a decrease in power generation, man-hours and costs related to manufacturing may be reduced.

In addition, the fuel cell stack FS may be installed on a vehicle as a power source for driving the vehicle. In this case, it is desirable to be set the natural frequency (resonance frequency) of laminate 1 at least 60 Hz. Thus, resonance of the laminate 1 by an external force such as the vehicle-specific vibration can be sufficiently suppressed.

In addition, although, in the above embodiment, a case has been described in which holding portion 3B of reinforcing plate 3 and laminate 1 are brought into contact, the holding portion 3B and laminate 1 may well be held as well in an adjacent state to each other with an extremely small gap to be brought into contact upon vibration input. In this case, at the same time of, laminate 1 and holding portion 3B contact each other, the vibration of laminate 1 may be suppressed by way of the holding portion 3B as a spring element.

Figure 5:
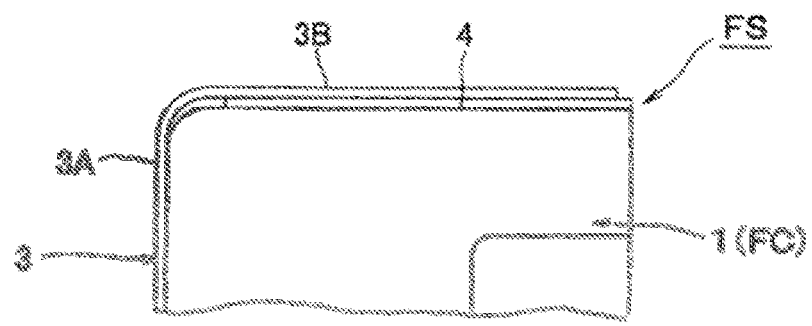
FIG. 5 is an enlarged cross-sectional view of an end portion of the reinforcing plate in another embodiment of the fuel cell stack according to the present invention.

FIG. 5 is a diagram illustrating another embodiment of the fuel cell stack according to the present invention. It should be noted that in each of the following embodiments, portions with the same configuration as the previous embodiment, a detailed description thereof will be omitted by attaching the same reference numerals.

The previous embodiment is a configuration in which the holding portion 3B of the reinforcing plate 3 is in contact with laminate 1. By comparison, in the present embodiment, the fastening is sized to cover the entirety of the second and fourth outer peripheral surfaces and both end portions of fastening plate 4 are interposed between the holding portion 3B of each reinforcing plate 3 and the laminate. Therefore, the holding portion 3B of reinforcing plate 3 is configured to provide a spring element imparting a spring action against the laminate 1.

Here, in addition to forming a notch 3D at the holding portion 3B of reinforcing plate 3 for avoiding the contact with the outer peripheral surface of end plate 2 as non-interference portion, at both sides of attachment portion 4A of each fastening plate 4, a similar notch or cut-out 4B (see FIG. 1A) is formed. Thus, the fastening plate 3 and holding portion 3B are prevented from contacting by their tip with end plate 2, and the spring element due to holding portion 3B acts on the laminate 1 only.

Even in the fuel cell stack FS above, a similar operation and effect of the previous embodiment is available. In particular, by superposing or overlapping the holding portion 3B of reinforcing plate 3 and fastening plate 4, a casing integrated structure may be achieved by end plate 2, reinforcing plate 3, and fastening plate 4, so that a separate, dedicated casing may be eliminated and contribution to further decrease in the number of parts or parts count and reduction of production costs may be made.

Figure 6A:
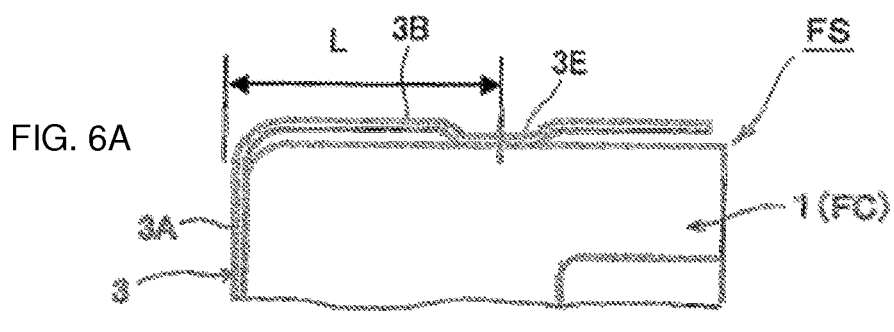
FIGS. 6A and 6B are enlarged cross-sectional side views of the end portion of the reinforcing plate in still another embodiment of the fuel cell stack of the present invention.
Figure 6B:
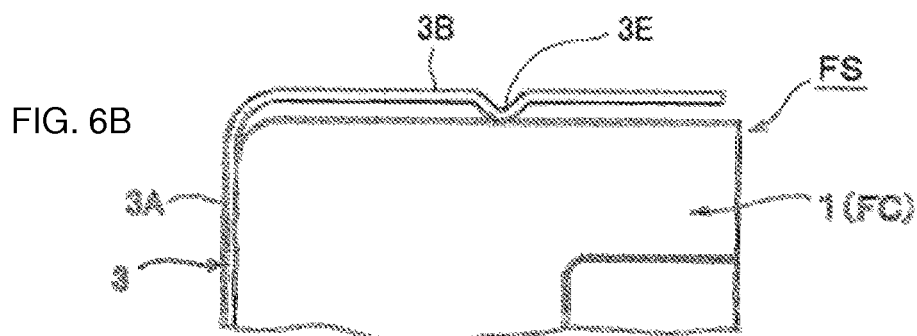

FIGS. 6A and 6B are diagrams illustrating yet another embodiment of the fuel cell stack according to the present invention. The fuel cell stack FS shown is provided at reinforcing plate 3 with a protruding portion 3E from holding portion 3B toward the laminate 1. The protruding portion 3E is formed in a rib along the cell stacking direction and, as shown in FIG. 6A, is provided with trapezoidal cross-section in surface contact with laminate 1 as shown in FIG. 6A, or is provided with a triangular cross section in surface contact with laminated 1. These protruding portions (ribs) may be formed by press working.

In the fuel cell stack FS described above, the holding portion 3B contacts laminate 1 reliably by way of protruding portion 3E so that the load point of the spring element on the side of laminate 1 is set, in addition to achieving the same operation and effect as the previous embodiment. More specifically, fuel cell stack FS may set the spring constant k of the spring element arbitrarily by selecting a length L from base portion 3A to protruding portion 3E, or area of contact with laminate 1 in accordance with various dimensions, materials, and the like of reinforcing plate 3.

In addition, as shown in the embodiment of FIG. 5, in the overlapped configuration between the holding portion 3B of reinforcing plate 3 and fastening plate 4, at the portion of fastening plate 4 overlapping with the holding portion 3B, the fastening plate 4 may be provided with a protrusion toward the holding portion 3B. Even with this configuration, the same operation and effect as the previous embodiment may be achieved. In addition, the protrusion portion is not limited in shape, but other than the continuous rib, a rib which protrudes partially with appropriate shape, for example, is also applicable.

Figure 7A:
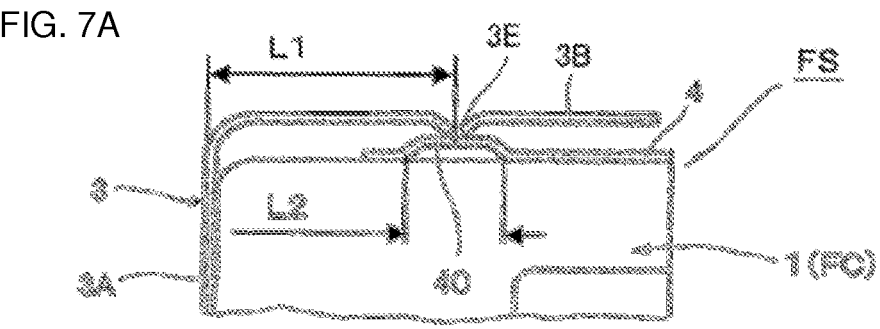
FIGS. 7A and 7B are enlarged cross-sectional side views of the end portion of the reinforcing plate in still another embodiment of the fuel cell stack of the present invention.
Figure 7B:
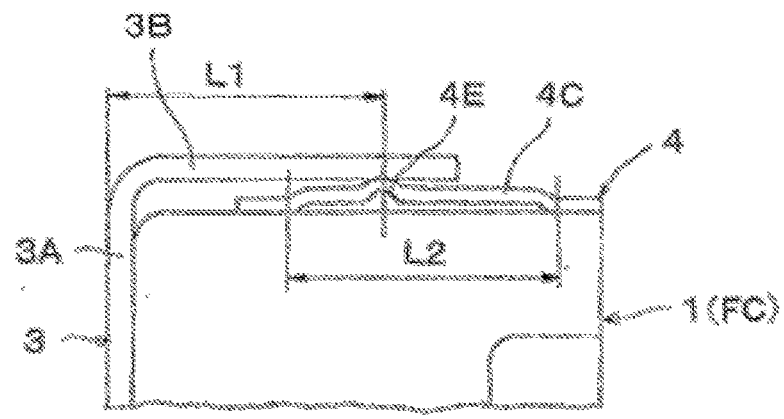

FIGS. 7A and 7B are diagrams illustrating yet another embodiment of the fuel cell stack according to the present invention. The fuel cell stack FS shown in FIG. 7A is structured with holding portion 3 of reinforcing plate 3 overlaid with fastening plate 4, and the holding portion 3B is provided with protruding portion 3E while fastening plate 4 is provided with an outwardly projecting portion 4C. In this fuel cell stack FS, the protruding portion 3E of reinforcing plate 3 and protruding portion 4C of fastening plate 4 are in contact to each other in a cross section perpendicular to the cell stacking direction of reinforcing plate 3.

In this embodiment, reinforcing plate 3 has a protruding portion 3E shaped in triangular cross section and has a length L1 between fulcrum to load point. In addition, fastening plate 4 has a protruding portion 4C with a rib of trapezoidal cross section and is formed as a beam supported at both ends of the length L2. Specifically, in this embodiment, the rib (protruding portion 4C) of fastening plate 4 is configured to form a beam structure with setting at the contact point of rib (protruding portion 3E) of reinforcing plate 3 as a load point so that this beam structure forms a spring element to support the laminate 1.

The fuel cell stack FS described above, in addition to obtaining the similar operation and effect with the previous embodiment, is capable of increasing the degree of freedom in setting the spring constant of the spring element (holding portion 3B, protruding portion 4C) by selection of length L1, L2 due to contact of the configuration in which the protruding portion 3E of holding portion 3B of reinforcing plate 3 with protruding portion 4C of fastening plate 4. Further, since the stress generated in the reinforcing plate 3 or fastening plate 4 (such as stress generated at the fixing end of holding portion 3B) may be reduced, ease of assembly of respective parts to laminate 1 or durability of respective parts may be improved.

In addition, the fuel cell stack FS shown in FIG. 7B has a configuration in which the holding plate 3B of reinforcing plate 3 and fastening plate 4 are overlapped, and the fastening plate 4 has an outwardly oriented protruding portion 4C while the protruding portion 4C has further an outwardly protruding portion 4E. In this fuel cell stack FS, holding portion 3B of reinforcing plate 3 and the protruding portion 4E of fastening plate 4 are in contact to each other in a cross section of reinforcing plate 3 perpendicular to a stacking direction of cells.

By the protrusion 4E of the fuel cell stack FS described above, the holding portion 3B contacts fastening plate 4 reliably, and the load point of the spring element (holding portion 3B) on the laminate 1 is set. In other words, the fuel cell stack FS may set the spring constant k of the spring element (holding portion 3B) freely by selecting the length L1 between the basic portion 3A and protruding portion 4E in accordance with various dimensions and materials of reinforcing plate 3 required for suppression of vibration of laminate 1.

In addition, the protruding portion 4C of fastening plate 4 in the fuel cell stack FS described above has a beam structure in which the position of contact between protruding portion 4E formed thereon and holding portion 3B represents a load point, and protruding portion 4C constitutes a spring element supporting laminate 1. In other words, by selecting the length L2 of protruding portion 4C, the spring constant k of the spring element (protruding portion 4C) may be set freely, and by the two spring elements (holding portion 3B, protruding portion 4C), the degree of freedom in setting the spring constant may even be increased.

Figure 8A:
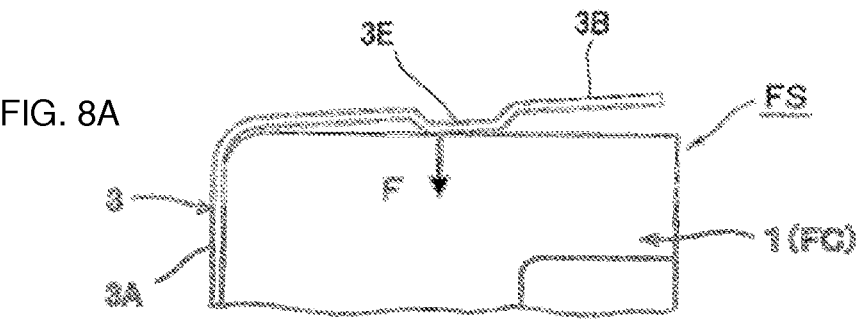
FIGS. 8A and 8B are enlarged cross-sectional side views of the end portion of the reinforcing plate in still another embodiment of the fuel cell stack of the present invention.
Figure 8B:
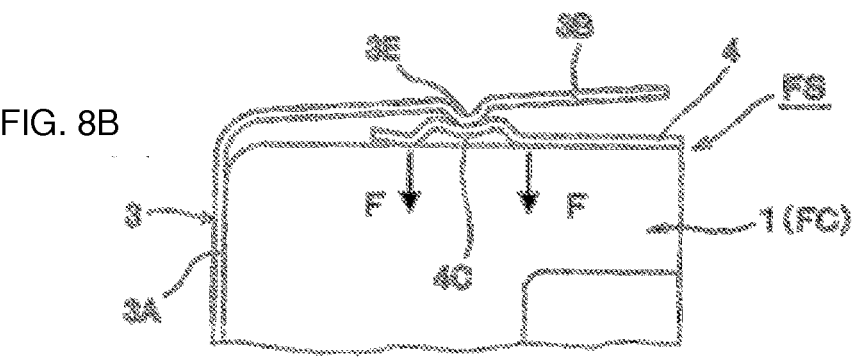

FIGS. 8A and 8B are diagrams illustrating yet another embodiment of the fuel cell stack according to the present invention. The fuel cell stack FS shown, has a configuration in which the reinforcing plate 3 is attached to the laminate 1 in the state in which the holding portion 3B is bent.

The fuel cell stack FS shown in FIG. 8A is configured in such a way that holding portion 3B of reinforcing plate 3 directly contacts laminate 1, and a protruding portion 3E comprised of rib of trapezoidal cross section is formed at holding portion 3B along the stacking direction of cells. This fuel cell stack FS represents a load point on one side of protruding portion 3E on the holding portion 3B as shown in figure by arrow F to thereby generate a pressing load toward lamination 1.

The fuel cell stack FS shown in FIG. 8B is configured in such a way that the holding portion 3B of reinforcing plate 3 is superposed or overlapped with fastening plate 4, and the holding portion 3B has a protruding portion 3E of rib formed of a triangular cross section, while the fastening plate 4 has a protruding portion 4C of rib formed of trapezoidal cross-section. In addition, the protruding portions 3E, 4C are in contact to each other. This fuel cell stack FS is especially at the protruding portion 4C of fastening plate 4 generate pressing or thrust load toward the laminate 1 by serving both sides of protruding portion 4C as load points as shown in figure by arrow F, F.

The fuel cell stack FS described above can assure contact of holding portion 3B with laminate 1 on even more reliable basis in addition to attaining the similar effect as the previous embodiment.

Figure 9:
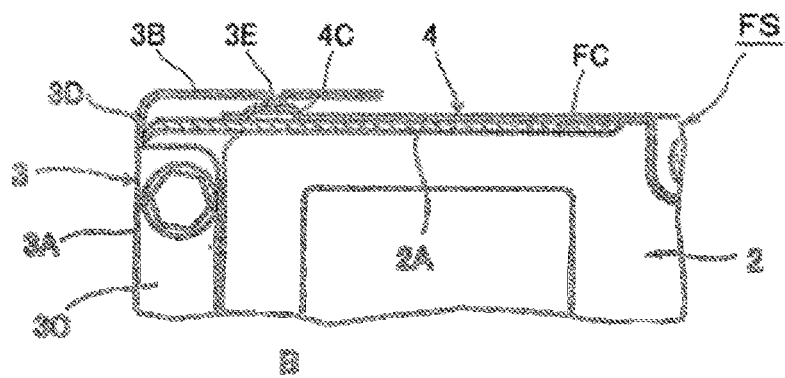
FIG. 9 is an enlarged side view of an end portion of the reinforcing plate in still another embodiment of the fuel cell stack of the present invention.

FIG. 9 is a diagram illustrating yet another embodiment of the fuel cell stack according to the present invention. The fuel cell stack FS shown is configured in such a way that the holding portion of reinforcing plate 3 is superposed or overlapped on the fastening plate 4, and at the portion of overlapping, the short side dimension of end plate 2 is set smaller than the short side dimension of the unit cell FC hatched in the figure.

Here, the fuel cell stack FS according to the present invention may be configured as a more preferred embodiment, to provide a non-interference portion on at least either holding portion 3B of reinforcing plate 3 or outer periphery of end plate 2. Further, the fuel cell stack FS according to the present invention is configured, as a more preferable embodiment, to provide a non-interference portion at least either on the superposed or overlaid portion of fastening plate with holding portion or periphery surface of end plate so as to avoid mutual contact between both parts.

That is, as described in the embodiment according to FIGS. 1 to 4, in the configuration in which holding portion 3B of reinforcing plate 3 is in contact with the laminate 1, holding portion 3B is provided with a notch 3D as a non-interference portion. Further, as explained regarding the embodiments based on FIG. 1 and FIG. 5, in a configuration in which holding portion 3B of reinforcing plate 3 and fastening plate are superposed or overlaid, both the holding portion 3B and fastening plate 4 have notches 3D, 4B respectively as non-interference portions. In these embodiments, by providing notches 3D, 4B, outer peripheral surface is avoided being contacted by holding portion 3B or fastening plate 4 around their tip.

Similar to these embodiments, the fuel cell stack FS shown in FIG. 9 is provided with a step portion 2A as non-interference portion at the outer periphery of end plate 2 whereby the short side dimension thereof is smaller than the short side dimension of unit cell FC. Thus, the outer peripheral surface of end plate 2 is avoided being contacted by holding portion 3B or fastening plate 4 around their tip whereby to apply the spring element to the laminate reliably.

In addition, in order for either holding portion 3B or fastening plate 4 to contact laminate 1 reliably, on the contrary to the case of FIG. 9, the short side dimension of at least both ends of the unit cell FC may be sized greater than the short side dimension of end plate 2. However, in this type of fuel cell stack, when considering several hundreds of unit cells being employed, compared to providing redundant projections on the side of unit cell, provision of non-interference portion on the sides of end plate 2, reinforcing plate 3 and fastening plate 4 is more advantageous in terms of structural reasons and manufacturing costs.

FIG. 10 is a diagram illustrating yet another embodiment of the fuel cell stack according to the present invention. The fuel cell stack FS shown is configured to bond the holding portion 3B of reinforcing plate 3 and fastening plate 4 at the superposed or overlaid location (sign W) of both components. This joining may be performed by using welding.

The fuel cell stack FS described above is capable of avoiding reliably the deviation of relative positions between reinforcing plate 3 and fastening plate 4 whereby prevent generation of vibration noise or separation of surface processed film previously, in addition to achieving the similar effect as the previous embodiment.

FIGS. 11A, 11B and 12A, 12B are diagrams illustrating yet another embodiment of the fuel cell stack 11 according to the present invention. The fuel cell stack FS according to the present invention may be configured, as a more preferred embodiment, in such a way that the reinforcing plate 3 is provided with a holding portion 3B at least on the abdomen or antinode locations in the stacking direction of cells, and a plurality of holding portions 3B are provided in the stacking direction of cells.

In other words, in the fuel cell stack FS of this type, when the laminate 1 is vibrated in a state of being supported by both end plates 2,2, the displacement of the abdomen or antinode part along the laminate 1 is the largest. Thus, by providing the holding portion 3 with respect to the part or anti-note at which the displacement is largest, a minimum configuration necessary to suppress the vibration of the laminate 1 is provided and the primary mode resonance of the laminate 1 may be suppressed at its antinode. Thus, the reinforcing plate 3 in the fuel cell stack FS may be configured to have a holding portion 3B at the central portion and may select a variety of forms.

In the fuel cell stack FS shown in FIG. 11A, the reinforcing plate 3 is provided with a holding portion 3B only at an anti-node or abdomen location, and this holding portion 3B is provided with protruding portion 3E toward the laminate 1. In the fuel cell stack FS shown in FIG. 11B, the reinforcing plate 3 is provided with holding portion 3B across the entire length along the stacking direction of cells while the holding portion 3B is provided with a protruding portion 3E toward laminate 1 only at the central position of cell stacking direction.

Figure 12A:
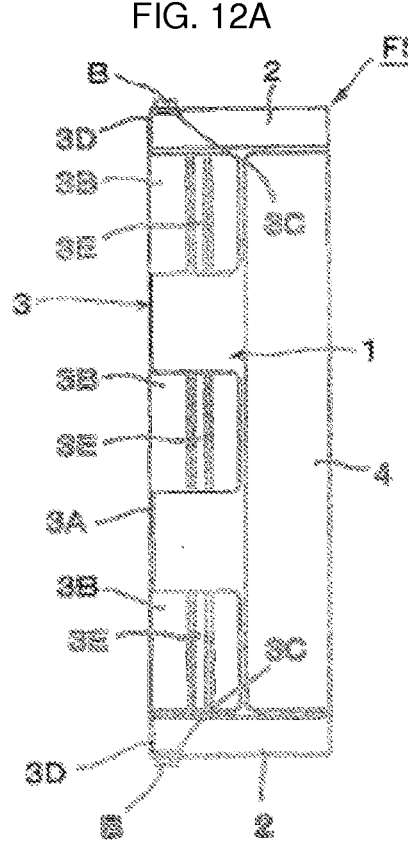
FIGS. 12A and 12B are respective plan views explaining the reinforcing plate in still another embodiment of the fuel cell stack of the present invention.
Figure 12B:
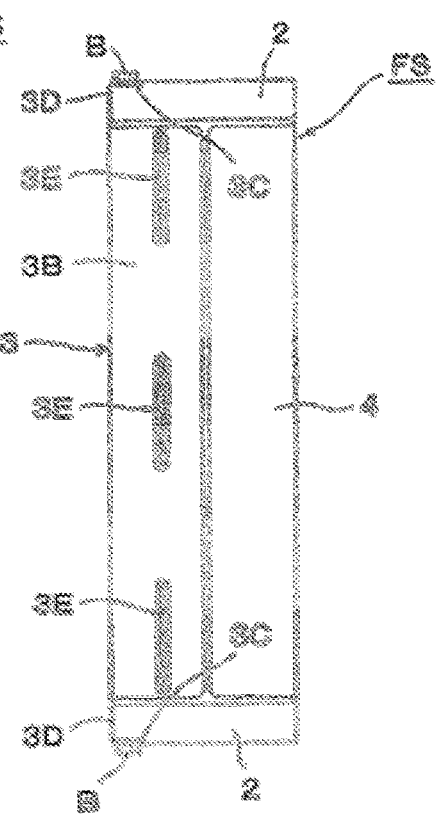

In the fuel cell stack FS shown in FIG. 12A, the reinforcing plate 3 is provided with holding portions 3B at the abdomen or anti-node position as well as both ends along the stacking direction, and each holding portion 3B is provided with protruding portion 3E toward laminate 1. In the fuel cell stack FS shown in FIG. 12B, the reinforcing plate 3 is provided with the holding position 3B across the entire length of laminate 1 in the stacking direction, and the holding portion 3B is provided with protruding portions 3E toward laminate 1 at three locations, i.e., at the central position as well as both ends of the cell stacking direction.

Thus, in the fuel cell stack FS, depending on the place desired to reduce the amplitude of the laminate 1, the position, number, shape, etc. of the holding portion and protruding portion 3E of reinforcing plate 3 may be freely selectable to thereby reduce vibrations of laminate 1 effectively.

The fuel cell stack according to the present invention, when laminate 1 is configured to contact holding portion 3B, as in a more preferable embodiment, the reinforcing plate 3 may be subjected to an insulating coating at least on the side of laminate. Further, when the holding portion 3B is configured to be superposed overlapped with fastening plate 4, as in a more preferable embodiment, the fastening plate 4 may be subjected to an insulating coating at least on the side of laminate.

Thus, in the fuel cell stack FS described above, without inserting the insulating member either between the reinforcing plate 3 and laminate 1 or between fastening plate 4 and laminate 1, the insulation inside and outside may be ensured and thus contribution to further decrease in part counts and costs and man-hours of manufacture is achieved.

Figure 13:
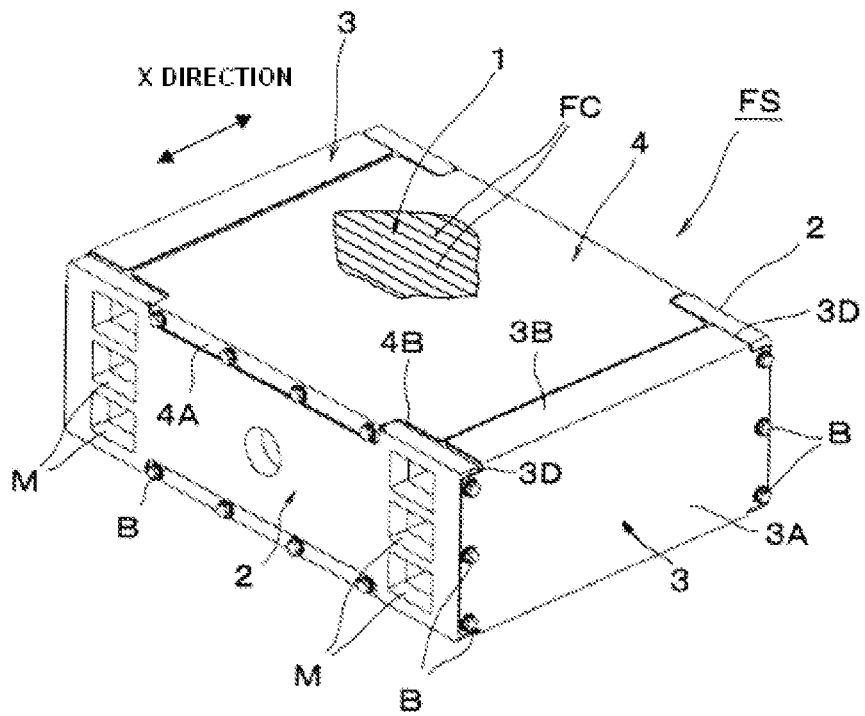
FIG. 13 is a perspective view for explaining another embodiment of the fuel cell stack of the present invention.

FIG. 13 is a diagram illustrating yet another embodiment of the fuel cell stack according to the present invention. Compared to those shown in FIG. 1A, the fuel cell stack FS illustrated has a configuration in that the reinforcing plate 3 does not have an attachment portion (3C) in a bent state. In this case, the reinforcing plate 3 is connected at both ends of base portion 3A to the outer peripheral surface of both end plates 2 by bolt B.

FIGS. 14A and 14B, FIG. 15 and FIG. 16 are diagrams illustrating yet another embodiment of the present invention the fuel cell stack. In the fuel cell stack FS illustrated, each fastening plate 4 is provided with a ventilation space 8 communicative with the outside formed between the second or fourth outer peripheral surface and the fastening plate. In addition, the fuel cell stack FS of this embodiment does not include a specific ventilation, but the ventilation space 8 is communicated to outside through a gap between notches 3D, 4B of reinforcing plate 3 and fastening plate 4 and end plate 2.

Figure 16:
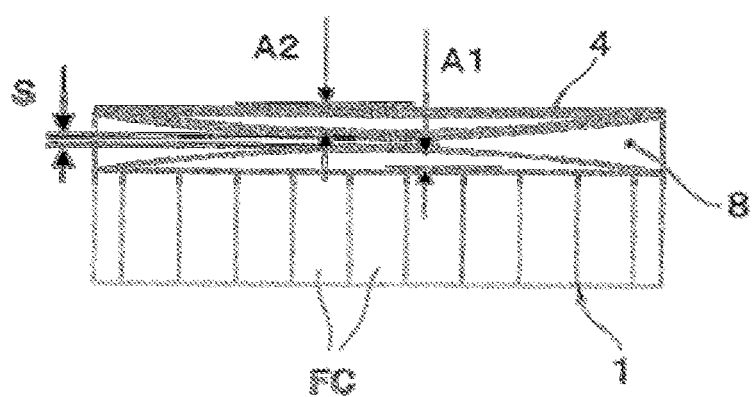
FIG. 16 is a cross-sectional view of an enlarged portion of the gap between the laminate and the fastening plate of the fuel cell stack shown in FIG. 14A.

As shown in FIG. 16, the ventilation space is sized to have a larger distance than the sum of one half of the displacement of laminate 1 (upper displacement amount A1 in the vertical vibrations) due to vibration and one half of the displacement of fastening plate 4 (downward displacement amount A2 in the vertical vibrations).

Figure 14A:
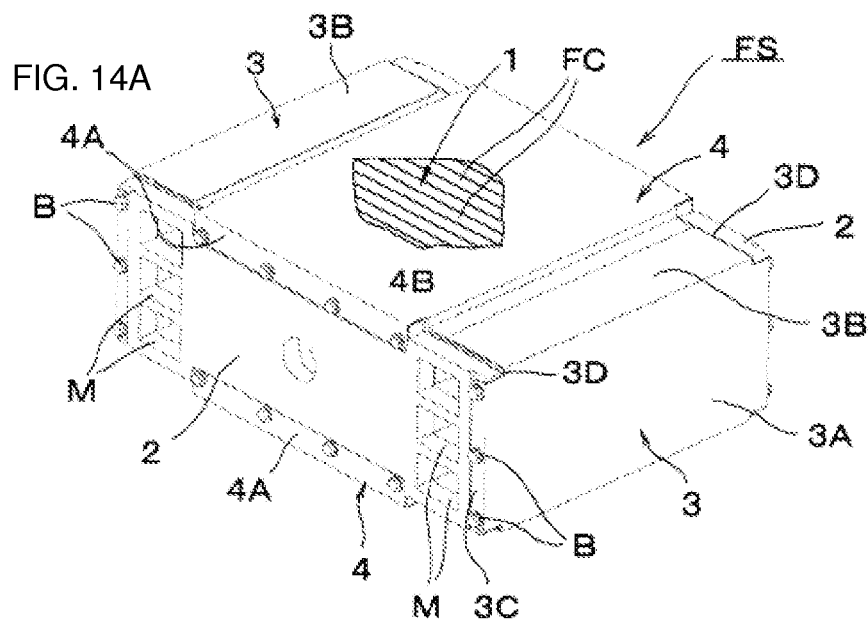
FIG. 14A is a perspective view illustrating still another embodiment of the fuel cell stack of the present invention and FIG. 14B is a cross-sectional view thereof.
Figure 14B:
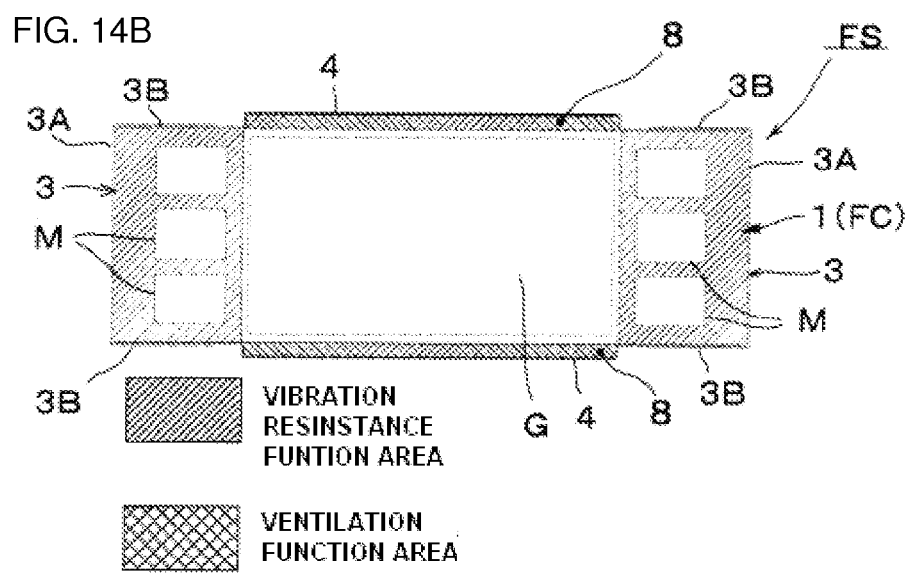
Figure 15:
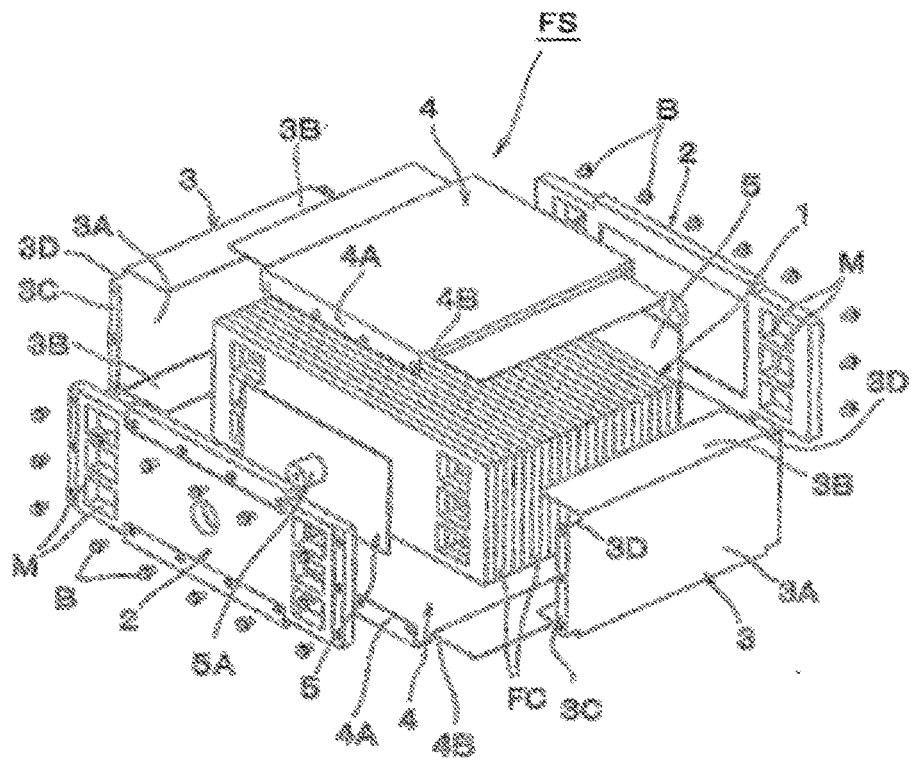
FIG. 15 is an exploded perspective view of the fuel cell stack shown in FIG. 14A.

The fuel cell stack FS described above is formed with a ventilation space 8 between laminate 1 and fastening plate 4. Thus hydrogen gas or steam leaked slightly from laminate 1 may be quickly discharged, and the occurrence of condensation inside and the accumulation of hydrogen gas may be prevented. In this manner, fuel cell stack FS is provided, as shown in FIG. 14B, with a ventilation function area denoted by mixed lines in the figure by the ventilation space 8 as well as anti-vibration or vibration resistance function area within a sandwiched or cramped area by the holding portion hatched in the figure.

That is, by employing the fastening plate 4 and the reinforcing plate 3 as described above, the fuel cell stack FS can achieve both to ensure improved vibration resistance and an internal ventilation function.

In addition, since the above-described fuel cell stack FS has a ventilation space 8 having a larger distance than the sum of one half of displacement amount of laminate 1 due to vibration and one half of displacement amount of fastening plate 4, even when laminate 1 and fastening plate 4 vibrate, a minimum of space or distance S may be maintained so that noise due to contact and damage to components may be avoided.

FIGS. 17A and 17B are diagrams illustrating yet another embodiment of the fuel cell stack according to the present invention. The fuel cell stack FS shown is configured to provide a plurality of vent openings for opening the ventilation space 8 to outside at predetermined intervals at the base portion of the attachment portion 4A of fastening plate 4. Further, fastening plate 4 is provided with a protruding portion 4C shaped in rib protruding to the side of holding portion 3B at the location of superposition between holding portion 35 of reinforcing plate 3 to open the end of protruding portion 4C to build a ventilation opening.

The fuel cell stack FS described above may increase the internal ventilation function even more by a plurality of vent openings 6 in addition to the similar operation and effect as the previous embodiment.

Figure 18A:
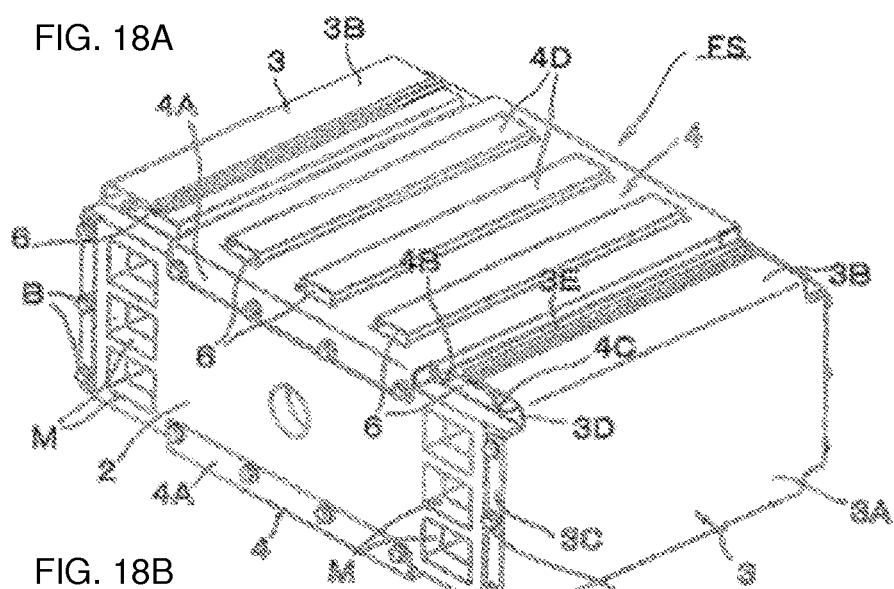
FIG. 18A is a perspective view illustrating still another embodiment of the fuel cell stack of the present invention and FIG. 18B is a side view thereof.
Figure 18B:
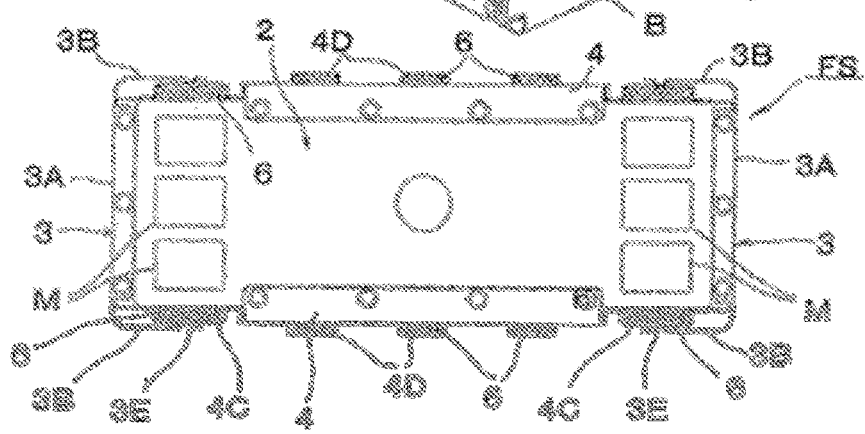

FIGS. 18A and 18B are diagrams illustrating yet another embodiment of the fuel cell stack according to the present invention. The fuel cell stack FS shown is provided at fastening plate 4 with outwardly protruding ribs 4D along the direction of cell stacking. In this embodiment, at three positions, i.e., at the central and both sides of fastening plate 4, ribs 4D are formed parallel to each other. These ribs 4D may be formed by press working, for example.

In addition, the fuel cell stack FS in this embodiment has both ends of each of ribs 4D opened to form a vent opening 6, and, as in the embodiment in FIG. 17A, both ends of protruding portion 4C of fastening plate 4 are formed by vent openings 6.

In the fuel cell stack FS, it is possible to obtain the operation and effect similar to the previous embodiment. Further, it is possible to enhance the ventilation function even more by a plurality of vent openings 6. Additionally, the rigidity of fastening plate 4 may be increased due to the plurality of ribs 4D. Thus, the fuel cell stack FS may have a small amplitude of fastening plate 4 (displacement amount due to vibration) together with a small distance to laminate 1, i.e., the space of ventilation space 8 so as to contribute to compactness of the overall device.

Figure 19A:
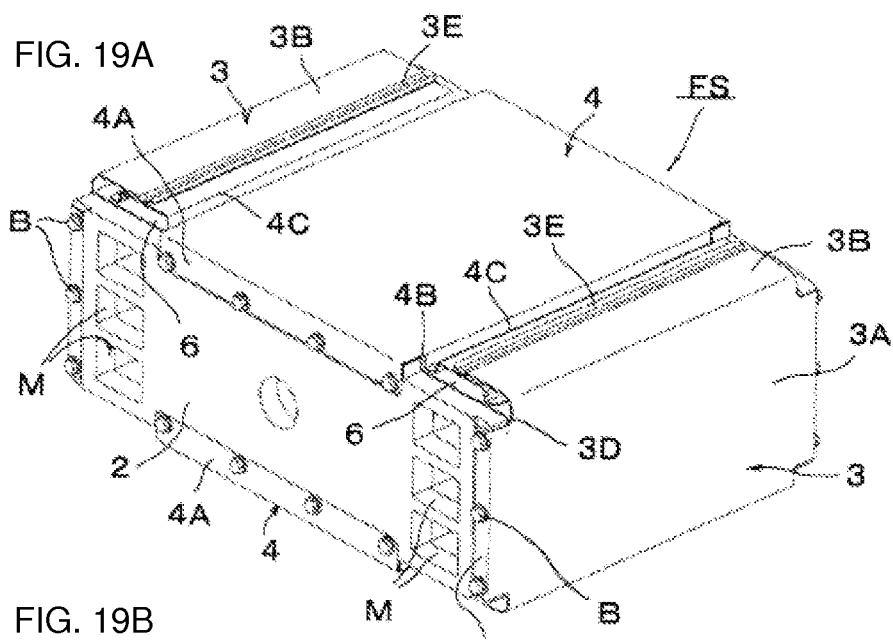
FIG. 19A is a perspective view illustrating still another embodiment of the fuel cell stack of the present invention and FIG. 19B is a cross-sectional view thereof.
Figure 19B:
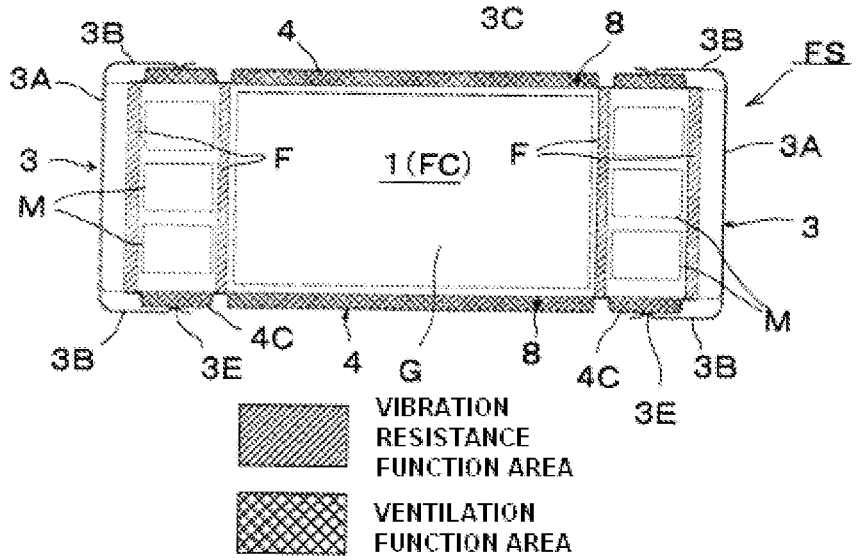

As shown in FIGS. 14A and 14B and 19A and 19B, the fuel cell stack according to the present invention has a power generating unit G in the center and three manifolds M at both sides of the power generating unit respectively for supplying/discharging reactant gas and cooling fluid. Further, the fuel cell stack FS is structured, as shown in FIG. 19B, in such a way that the protruding portions 3E, 4C apply clamping force to laminate 1 at the frame portion F which forms the periphery of the manifold M and the power generating unit G.

More specifically, the protruding portions 3E, 4C of reinforcing plate 3 and fastening plate 4 are formed, similar to the embodiment shown in FIG. 7A, by a protruding portion 3E in V-shaped cross section and a protruding portion 4C of flat, trapezoidal cross section. Moreover, especially the protruding portion 4C of fastening plate 4 has a width extending from the vicinity of long side of unit cell FC to the frame portion F partitioning power generating unit G and manifold M. Thus, the clamping force for laminate 1 by protruding portions are imparted, as shown by dashed lines in FIG. 19B, in the direction of the short side of unit cell FC at the both sides of manifold M along the long side of unit cell FC.

The fuel cell stack FS described above is capable of avoiding the pressing load to be applied at the portion of low rigidity of unit cell FC, i.e., at the power generating unit G and manifold portion M and give the clamping force due to reinforcing plate 3 and protruding portions 3E, 4C to laminate 1 effectively.

In addition, since reaction gas is constantly circulating in manifold M, by imparting clamping force by avoiding the location of the manifold M, damage to the manifold M and leak of reactant gas are avoidable. Furthermore, in the power generating unit G, water is generated and a large amount of moisture vapor is transferred, as shown in FIG. 19B by crossed lines, by placing ventilation space 8 adjacent to power generating unit G, the occurrence of condensation may be effectively prevented.

Figure 20A:
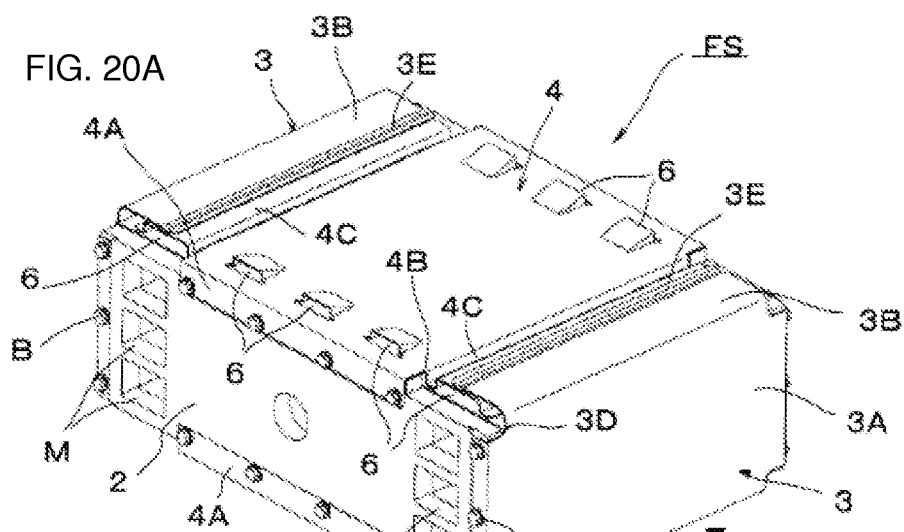
FIG. 20A is a perspective view illustrating still another embodiment of the fuel cell stack of the present invention and FIG. 20B is a cross-sectional view thereof.
Figure 20B:
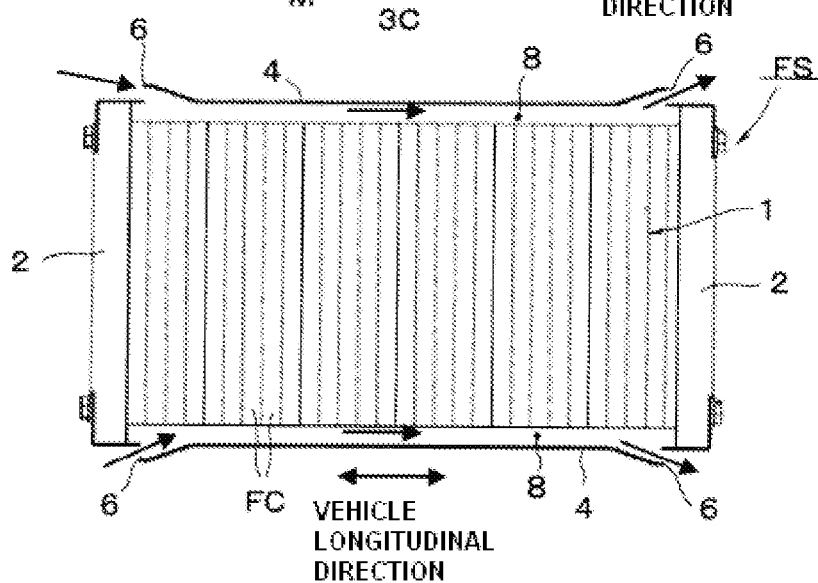

FIGS. 20A and 20B are diagrams illustrating yet another embodiment of the fuel cell stack according to the present invention. The fuel cell stack FS according to the present invention may be stored, as mentioned above, on a vehicle as vehicle driving power source. In this case, as a more preferable embodiment, as shown in FIG. 20A, the vent opening 6 to the outside from ventilation space 8 opens in the longitudinal direction of the vehicle. In the illustrated example, the direction of stacking cells lies in the vehicle longitudinal direction and, at both sides of fastening plate 4, three vent openings 6 are disposed at preset intervals respectively.

As shown in FIG. 20B, outside air which is introduced associated with the traveling of the vehicle flows into a forward vent 6 naturally, circulates internally, and then flows out from the rearward vent 6. Thus, the ventilation during vehicle travel is greatly increased to achieve a further improvement in ventilation function.

In addition, the fuel cell stack FS according to the present invention, when installed on the vehicle as a power source for driving the vehicle, it is possible to structure, as a more preferred embodiment, in such a way that the vent opening 6 opens to the rear of the vehicle. In such fuel cell stack FS, in addition to securing good ventilation, water or foreign matter such as dust may be prevented from entering the vehicle interior during travel.

The fuel cell stack according to the present invention may be configured to apply insulating coating on the surface of reinforcing plate 3 at least on the side of laminate 1. Further, it is also possible to apply the insulating coating on the surface of fastening plate 4 on the side of laminate 1. Thus, without inserting insulating member between the reinforcing plate 3 and laminate 1, or between fastening plate 4 and the laminate 1, the fuel cell stack FS above is ensured for insulation inside and outside, contributing to further reduction of the number of components as well as to a further reduction of man-hours and cost of manufacture.

The fuel cell stack according to the present invention is not limited in configuration to those in respective embodiments described above, but configuration, the number, material and the like may be subject to change suitably without departing from the scope of the essence of the present invention.

For example, in the above embodiment, reinforcing plates are disposed on the short sides, i.e., on the first and third outer peripheral surfaces of the laminate. However, instead of on the first and third periphery surfaces, the reinforcing plates may be disposed on the long sides of the laminate, i.e. on the second and fourth outer peripheral surfaces.

The invention claimed is:

1. A fuel cell stack comprising:
a laminate formed by stacking a plurality of unit cells of rectangular plate shape between end plates disposed on both end surfaces of the laminate in a cell stacking direction, four surfaces parallel to the cell stacking direction of the laminate being defined as a first outer peripheral surface located on a right side, a second peripheral surface located on an upper side, a third outer peripheral surface on a left side, and a fourth outer peripheral surface on a lower side;
a pair of reinforcing plates provided on a first outer peripheral surface and a third outer peripheral surface, respectively, with both end plates being connected to each reinforcing plate; and
a pair of fastening plates respectively covering the second outer peripheral surface and the fourth outer peripheral surface of the laminate with both end plates being connected to each fastening plate, wherein each reinforcing plate comprises:
a base portion for each reinforcing plate covering the first outer peripheral surface or the third outer peripheral surface of the laminate; and
a pair of holding portions extending perpendicularly from the base portion and integrally structured with the base portion to partially cover the second outer peripheral surface and the fourth outer peripheral surface of the laminate, each of the pair of holding portions having a protruding portion in the form of a groove along the cell stacking direction and protruding toward the laminate, each holding portion configured to support the laminate as a spring element with a load point at the protruding portion.

2. The fuel cell stack claimed in claim 1, wherein the fastening plate is interposed between the holding portion of each reinforcing plate and the laminate.

3. The fuel cell stack claimed in claim 1, wherein each fastening plate is provided with a protruding portion protruding toward the holding portion where each fastening plate overlaps with a respective holding portion.

4. The fuel cell stack claimed in claim 3, wherein each fastening plate is provided with a protruding portion protruding toward the laminate, the protruding portion of each holding portion and the protruding portion of a respective fastening plate abut against each other in a cross section of the reinforcing plate perpendicular to the cell stacking direction, and wherein the protruding portion of the fastening plate is formed in a rib along the cell stacking direction, and the rib is formed as a beam structure with a contact position of the protruding portion of a counterpart being a load point.

5. The fuel cell stack claimed in claim 1, wherein the reinforcing plate is attached to the laminate in a state in which the holding portion is bent.

6. The fuel cell stack claimed in claim 1, wherein the reinforcing plate is provided with the holding portion at least at an antinode position in the cell stacking direction.

7. The fuel cell stack claimed in claim 1, wherein the reinforcing plate is provided with a plurality of holding portions in the cell stacking direction.

8. The fuel cell stack claimed in claim 1, further comprising:
a pair of fastening plates covering the second outer peripheral surface and the fourth outer peripheral surface with both end plates being connected to each fastening plate respectively, and a ventilation space is provided to be communicative with an outside between the second outer peripheral surface and the fourth outer peripheral surface of the laminate and each fastening plate.

9. The fuel cell stack claimed in claim 8, wherein the ventilation space formed between the laminate and the fastening plate is sized to have a distance larger than a sum of one half of a displacement amount of the laminate upon vibration and one half of a displacement amount of the fastening plate.

10. The fuel cell stack claimed in claim 8, wherein each fastening plate is provided with a protruding portion protruding toward the holding portion where each fastening plate overlaps the holding portion, the protruding portion provided at least on an end thereof with a vent opening to the outside from the ventilation space.

11. The fuel cell stack claimed in claim 3, wherein the unit cell has a power generating unit in a center and a manifold for circulating reaction gas on both sides of the power generating unit, and the protruding portion imparts a clamping force to the laminate at a location of a frame forming a circumference of the power generating unit and the manifold.

12. The fuel cell stack claimed in claim 8, wherein the fuel cell stack is installed on a vehicle as a vehicle driving power source, and a vent opening to the outside from the ventilation space opens in a longitudinal direction of the vehicle.

13. The fuel cell stack claimed in claim 10, wherein the vent opening opens toward a rear of a vehicle.

\* \* \* \* \*